United States Patent [19]

Thukral

[11] 3,993,588

[45] Nov. 23, 1976

[54] POLYMERIZATION CATALYST

[75] Inventor: Prem Sagar Thukral, Kenley, England

[73] Assignee: The British Petroleum Company Limited, London, England

[22] Filed: Dec. 4, 1974

[21] Appl. No.: 529,391

[30] Foreign Application Priority Data

Dec. 13, 1973 United Kingdom............... 57738/73

[52] U.S. Cl............................. 252/429 C; 252/428; 252/430; 252/441; 526/130; 526/348; 526/349; 526/352

[51] Int. Cl.²....................... C08F 4/02; C08F 4/16; C08F 4/20; C08F 4/22

[58] Field of Search................ 252/429 C, 428, 430, 252/441

[56] References Cited

UNITED STATES PATENTS

| | | | |
|---|---|---|---|
| 3,202,645 | 8/1965 | Yancey............................ | 252/441 X |
| 3,280,096 | 10/1966 | MacKenzie..................... | 252/430 X |
| 3,644,318 | 2/1972 | Diedrich et al............. | 252/429 C X |
| 3,759,884 | 9/1973 | Tokuzumi et al........... | 252/429 C X |
| 3,787,384 | 1/1974 | Stevens et al............... | 252/429 C X |

*Primary Examiner*—Patrick P. Garvin
*Attorney, Agent, or Firm*—Brooks, Haidt, Haffner & Delahunty

[57] ABSTRACT

Process for preparing a supported Ziegler catalyst precursor by heating together, at a temperature in the range 150°–1000° C, an inorganic support having surface hydroxyl groups and a magnesium compound selected from the oxide, hydroxides, salts and alkoxides and incorporating a transition metal compound therein.

12 Claims, No Drawings

POLYMERIZATION CATALYST

The present invention relates to a process for the production of a supported Ziegler catalyst and to the use of the catalyst in the polymerisation of olefins.

It has long been known that olefins such as ethylene can be polymerised by contacting them under polymerisation conditions with a catalyst comprising a transition metal compound, e.g. titanium tetrachloride and a co-catalyst or activator, e.g. an organometallic compound such as triethyl aluminium. Catalysts of this type are generally referred to as Ziegler catalysts and will be referred to as such throughout this specification. The catalyst and co-catalyst together will be referred to as activated Ziegler catalysts. It is also known to deposit such catalysts on support materials such as silicon carbide, calcium phosphate, magnesium or sodium carbonate. More recently it has been found that catalysts of the supported Ziegler type can be made by reacting a compound of a transition metal with a solid support comprising a hydroxychloride of a bivalent metal. This type of catalyst, together with a conventional co-catalyst, forms a useful activated supported Ziegler catalyst. (See U.K. patent specification No. 1,024,336). It is further known to polymerise olefins using an activated supported Ziegler catalyst comprising a hydride or organometallic compound of a metal of Group I, II or III of the Periodic system as activator and, as the supported Ziegler catalyst, the product obtained by contacting a titanium tetrahalide with a support comprising an anhydrous magnesium or zinc halide in an active form in which the highest intensity diffraction line in the X-ray powder spectrum is replaced by a halo of lower intensity and/or having a surface area greater than 3 square meters per gramme.

It is an object of the present invention to provide an improved supported Ziegler catalyst.

Accordingly the present invention provides a process for the production of a supported Ziegler catalyst comprising heating together at a temperature in the range 150° to 1000° C an inorganic oxide support material selected from silica or a silica composite having chemisorbed surface hydroxyl groups and a magnesium compound selected from magnesium halides or magnesium alkoxides and incorporating a transition metal compound therein.

The invention further provides a process for the polymerisation of 1-olefins comprising contacting the monomer under polymerisation conditions with the supported Ziegler catalyst of the present invention in the presence of a Ziegler catalyst activator.

The support material employed in the catalyst preparation is suitably any porous particulate silica or silica composite containing at least 50% wt. of silica e.g. silica-alumina, and having chemisorbed surface hydroxyl groups. The inorganic oxide support material preferably contains at least 90% wt. of silica and most preferably at least 99% wt. of silica. Preferred silicas and silica composites are those suitable for use in the well-known Phillips process for the polymerisation of ethylene (see for example U.K. patent specification Nos. 790,195; 804,641; 853,414; French Pat. Nos. 2,015,128; 2,015,130 and Belgian Pat. No. 741,437). Microspheroidal silicas and silica-aluminas having a mean particle diameter in the range 30 to 300 $\mu$m, a surface area of 50 to 1000 square meters per gram and a pore volume (as determined by water porosimetry) of 0.5 to 3.5 cc/gram are particularly preferred. The support material is preferably substantially dry, i.e., free from physically absorbed water before heating with the magnesium compound and is most preferably dried by heating for several hours in a vacuum oven at a temperature in the range 70° to 150° C. Heating overnight in vacuo at about 110° C normally gives adequate drying.

The pore volume is determined by water porosimetry as follows. A sample of the support is dried thoroughly by heating at 500° C for 5 hours. A sample of about 5g. is weighed out accurately from the dry sample and transferred to a 2 ounce wide necked screw cap glass jar. Distilled water is then run in from a burette until approximately 0.3 ml. less than the expected pore volume has been added. The lid is screwed on and the jar shaken vigorously by hand for 20 seconds, then on a laboratory shaker for 3 minutes after which any lumps are broken down with a spatula. A further 0.1 ml of water is added from the burette and the shaking procedure is repeated. The bottom of the jar is then firmly rapped on the bench top 3 times to consolidate the sample and the jar is then quickly inverted. If the sample does not flow freely but sticks to the bottom of the jar for two seconds or more the end point has been reached (or passed) in which case the determination should be repeated using a smaller quantity of water in the first addition. If the sample flows freely when the jar is inverted then further 0.1 ml aliquots of water are added from the burette and the shaking procedure repeated until the end point is reached. The water pore volume is given by the expression $c/w$ where $c$ = volume (ml) of distilled water used to end point and $w$ = weight (grammes) of dry sample. The determination is carried out in duplicate and the mean value of the two results is taken as the pore volume.

The magnesium compound used in the process of the present invention is suitably a magnesium salt (e.g. a halide) or an alkoxide e.g. Mg $(EtO)_2$. Magnesium chloride is preferred, particularly the dried or anhydrous material.

The transition metal compound used in making the catalyst of the present invention may be any of the transition metal compounds known to be useful in forming Ziegler catalysts. Especially useful for this purpose are the halides, halo-alkoxides and alkoxides of the metals of groups IVa, Va and VIa of the Periodic Table. Particularly preferred are the compounds of titanium having the general formula Ti $(OR)_n(Cl)_{4-n}$ wherein $n$ has any value from 0–4 inclusive and R is an alkyl groups preferably containing 1–6 carbon atoms, for example, titanium tetrachloride, titanium tetraethylate, titanium tetraisopropylate, Ti $(O\ C_2\ H_5)_3Cl$, Ti-$(OiPr)_2Cl_2$ or mixtures thereof.

The quantity of magnesium compound used in the process of the present invention can vary widely. Suitably sufficient magnesium compound is employed to give a magnesium concentration in the range 0.5 to 20% preferably 3 to 10% based on the weight of the support material.

The quantity of transition metal compound used is suitably such as to give a concentration of transition metal in the range 0.5 to 20% and preferably in the range 4 to 10% based on the total weight of catalyst.

The magnesium compound and the support material can be mixed together and heated in any desired manner. For example, the magnesium compound can be dissolved in or prepared in a solvent, then added to the support material after which the solvent can be evaporated; or a mixture of the powdered magnesium compound and the support material can be heated, for example, in a fixed or fluidised bed; or the magnesium compound and the support can be ground or milled together; or the magnesium compound can be melted in the presence of the support and the solidified melt then pulverised and further heated if desired. It is preferred that the magnesium compound is in an anhydrous state prior to the heating. The heating is preferably carried out by heating together the magnesium compound in a powdered form and the support material at a temperature in the range 150° to 1000° C most preferably 300° to 800° C. The heating time can vary widely, for example, ½ to 10 hours but heating for from 1 to 5 hours gives satisfactory results. Preferably the magnesium compound and the support material are heated under fluidised bed conditions. The fluidising gas can be air but is preferably a dry inert gas, for example, dry nitrogen.

The transition metal compound can be incorporated in the catalyst of the present invention using any of the known techniques employed in the art of preparing supported Ziegler catalysts. Preferably the product of heating together the magnesium compound and the support material is heated with the transition metal compound at a temperature in the range 50°–200° C. This can be carried out, for example, by heating a mixture of the aforesaid product and the transition metal compound either alone or in the presence of an inert diluent or a solvent for the transition metal compound; or the vapour of a volatile transition metal compound may be passed into a heated bed, e.g. a fluidised bed, of the said product. It is preferred to heat the said product of heating the magnesium compound and the support material and the transition metal compound together at a temperature in the range 70° to 100° C for ½ to 5 hours in the presence of an inert diluent or a solvent for the transition metal compound. Suitable inert diluents (which are in some cases also solvents for the transition metal compound) are, for example, saturated aliphatic hydrocarbons such as petroleum ether, butane, pentane, hexane, heptane, methyl cyclohexane and cyclohexane and aromatic hydrocarbons such as benzene, toluene and xylene.

Any excess transition metal compound remaining in the catalyst after the incorporation step is preferably removed from the catalyst, for example, by solvent washing, distillation or other convenient techniques which do not have a deleterious effect on the catalyst. Excess titanium compounds having the formula Ti-$(OR)_nCl_{4-n}$ as hereinbefore described are preferably removed by washing the catalyst several times with solvents such as, for example, those listed in the previous paragraph.

All stages of catalyst preparation are preferably carried out in the absence of oxygen or moisture.

As in the case with other supported Ziegler catalysts the catalyst of the present invention must be activated with a Ziegler catalyst activator. Ziegler catalyst activators and the methods by which they are used to activate Ziegler catalysts are well known. Examples of Ziegler catalyst activators are organic derivatives or hydrides of metals of Groups I, II, III and IV of the Periodic Table. Particularly preferred are the trialkyl aluminiums or an alkyl aluminium halide, e.g. triethyl or tributyl aluminium.

The polymerisation process according to the present invention can be applied to the polymerisation of 1-olefins e.g. ethylene or propylene or mixtures of olefins, e.g. ethylene with other 1-olefins, for example, propylene, 1-butene, 1-pentene, 1-hexene, 4-methyl pentene-1, 1,3-butadiene or isoprene. The process is particularly suitable for the polymerisation of ethylene or copolymerisation of ethylene with up to 40 weight % (based on total monomer) of comonomers, i.e. one or more other 1-olefins.

The polymerisation conditions can be in accordance with known techniques used in supported Ziegler polymerisation. The polymerisation can be carried out in the gaseous phase or in the presence of a dispersion medium in which the monomer is soluble. As a liquid dispersion medium use can be made of an inert hydrocarbon which is liquid under the polymerisation conditions, or of the monomer or monomers themselves maintained in the liquid state under their saturation pressure. The polymerisation can, if desired, be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3-30 carbon atoms per molecule. Suitable diluents include, for example, isopentane, isobutane, and cyclohexane. Isobutane is preferred.

The polymerisation can be carried out uner continuous or batch conditions.

Methods of recovering the product polyolefin are well known in the art.

The polymerisation catalyst of the present invention can be used to make high density ethylene polymers and copolymers at high productivity having proporties which render them suitable for injection moulding.

The invention is further illustrated by the following examples:

In the Examples the melt index ($MI_{2.16}$) and high load melt index ($MI_{21.6}$) were determined according to ASTM method 1238 using 2.16 kg and 21.6 kg loads respectively; the units are grammes per 10 minutes.

EXAMPLES 1–4

$MgCl_2.6H_2O$ was dried overnight in a vacuum oven at 150° C. The water content then corresponded to $MgCl_2.1.12H_2O$. This material was ground and a sieve-cut of 53-106 mesh was taken.

5.7g of $MgCl_2.1.12H_2O$ prepared as above was added to 9.1g Davison Grade 951 silica (previously dried overnight in a vacuum oven and maintained at this temperature for 3 hours fluidised under a flow of dry nitrogen of 0.75 liters per minute. The catalyst support was stored under dry nitrogen and all subsequent operations were carried out under an atmosphere of dry nitrogen.

Isopropanol (5.58g) titanium tetraisopropylate (52.7g) and titanium tetrachloride (34.8g) were added to a suspension of the support (10.8g) in dry hexane fraction. The mixture was refluxed for 2 hours. The supernatant liquid was decanted off and the solid material washed with 40 ml dry hexane fraction, the washings being removed by decanting. Washing and decanting were repeated 10 times. Finally a slurry of the catalyst in hexane fraction was made up with a solids content of 165.2 mg/ml.

The polymerisations were carried out in either a ½ gallon (A) or a 1 liter (B) stainless steel stirred autoclave. The slurry was added with a syringe to the reactor purged with nitrogen and maintained at 30°–40° C. Aluminium trisobutyl was then added, followed by 1 liter (A) or 500 ml (B) isobutane diluent. The reactor was heated until the pressure of the isobutane reached 100 p.s.i.g. (58° C) when hydrogen was added (if employed). Further heating brought the reactor to the polymerisation temperature (90° C) when ethylene was added to bring the total pressure of the reactor contents to 600 p.s.i.g. Ethylene was added continually to maintain this pressure during the reaction. The polymerisation conditions and results are summarised in the Table.

EXAMPLES 5–6

Davison Grade 951 silica (20.0g) was dried at 150° C under vacuum overnight. Magnesium ethoxide (15.1g) which had a particle size of 45–106 μm mesh was dried at 80° C under vacuum overnight. The silica and magnesium ethoxide were mixed and charged to a fluidised bed activation furnace and heated at 300° C for 4½ hours. The fluidising gas was nitrogen. The support contained 12.2% Mg. The support (6.5g) was slurried with dried, deoxygenated cyclohexane (100 ml) and then dry isobutanol (6.3 ml), titanium tetraisopropylate (53.5 ml) and titanium tetrachloride (20.0 ml) were added. The mixture was stirred under nitrogen purged reflux for 2 hours and the produced catalyst was washed ten times with cyclohexane to remove excess titanium. Finally a slurry was made up in hexane fraction and this had a solids content of 128.2 milligrammes per milliliter. The solid contained 6.9% Mg, 22.2% Cl and 4.4% Ti by weight.

The polymerisations were carried out in ½ gallon stainless steel stirred autoclaves. The slurry of catalyst was syringed into the reactor which was purged with nitrogen and maintained at 30°–40° C. Aluminium triisobutyl was added followed by isobutane (1 liter). The reactor was heated until the pressure of the isobutane reached 100 p.s.i.g. (at 58° C). Hydrogen was added (if employed, see Table). Further heating brought the reactor to the polymerisation temperature (90° C) and ethylene was admitted to bring the total pressure of the reactor contents to 600 p.s.i.g. Ethylene was added continuously to maintain this pressure during the polymerisation.

I claim:

1. A process for the production of a supported Ziegler catalyst comprising: (a) heating together at a temperature in the range of about 150°–1000° C an inorganic oxide material having surface hydroxyl groups selected from the group consisting of silica and a silica composite containing at least 50% by weight of silica and a magnesium compound selected from the group consisting of magnesium halides and magnesium alkoxides, and (b) incorporating a Group IV(a), V(a), or VI(a) of the Periodic Table transition metal halide, alkoxide, or haloalkoxide compound therein, said catalyst having a magnesium concentration of from about 0.5 to 20% by weight based on the weight of the support material and a concentration of transition metal of from 0.5 to 20% by weight based on the total weight of the catalyst.

2. A process as claimed in claim 1 wherein the inorganic oxide support material is a porous particulate silica or silica-alumina.

3. A process as claimed in claim 1 wherein the inorganic oxide support material is silica having a mean particle diameter in the range 30 to 300μm, a surface area of 50 to 1000 $m^2 g^{-1}$ and a pore volume of 0.5 to 3.5 milliliters per gramme.

4. A process as claimed in claim 1, wherein the inorganic oxide support material contains at least 90% wt. of silica.

5. A process as claimed in claim 1 wherein the magnesium compound is magnesium chloride.

6. A process as claimed in claim 1 wherein the transition metal compound is a titanium compound.

7. A process as claimed in claim 6 wherein the titanium compound has the general formula $Ti(OR)_n(Cl)_{4-n}$ wherein n has any value from 0–4 inclusive and R is an alkyl group containing 1–6 carbon atoms.

8. A process as claimed in claim 6 wherein the titanium compound is selected from the group consisting of $TiCl_4$, $Ti(OEt)_4$, $Ti(OiPr)_4$, $Ti(OEt)_3Cl$, $Ti(OiPr)_2Cl_2$ and mixtures thereof.

9. A process as claimed in claim 1 wherein the quantity of magnesium compound employed is sufficient to give a magnesium concentration in the range 3 to 10% based on the weight of the support material.

10. A process as claimed in claim 1 wherein the quantity of transition metal compound employed is sufficient to give a concentration of transition metal in

TABLE

| Example | Reactor (see text) | Wt. (g) of Solid Catalyst Component Added | Vol (ml) of Al (iBu)$_3$ | Partial Pressure (psi) of H$_2$ | Partial Pressure (psi) of C$_2$H$_4$ | Run Length (min) | Catalyst Productivity (g/g/hr) | MI$_{2.16}$ | MIR | Remarks |
|---|---|---|---|---|---|---|---|---|---|---|
| 1 | B | 0.083 | 1.0 | 0 | 175 | 25 | 3,200 | — | — | MI$_{21.6}$ too low to measure |
| 2 | A | 0.083 | 1.0 | 150 | 225 | 60 | 4,060 | 19.1 17.1* | 32.1 28.8* | |
| 3 | A | 0.083 | 1.0 | 125 | 250 | 50 | 7,410 | 9.83 9.76* | 30.6 32.9* | |
| 4 | B | 0.041 | 0.5 | 0 | 375 | 13 | 31,800 | — | — | MI$_{21.6}$ too low to measure |
| 5 | A | 0.064 | 1.0 | 0 | 375 | 46 | 3,070 | — | — | MI$_{2.16}$ too low to measure |
| 6 | A | 0.128 | 1.0 | 125 | 250 | 37 | 2,100 | 16.3* | 30.9* | |

Notes:
*After homogenisation on a mill together with antioxidant.
1) Catalyst productivity is expressed in g/g solid catalyst component/hr.
2) All runs carried out at 600 psig total pressure except first run where total pressure was 400 psig.

the range 4 to 10% based on the total weight of the catalyst.

11. A process as claimed in claim 1 wherein the heating of the inorganic oxide support material and the magnesium compound is carried out at a temperature in the range 300° to 800° C.

12. A process as claimed in claim 1 wherein said transition metal compound is incorporated in the catalyst by heating at from about 50° to 200° C said compound with the product obtained by heating said magnesium compound and said silica support material.

* * * * *

UNITED STATES PATENT AND TRADEMARK OFFICE
CERTIFICATE OF CORRECTION

PATENT NO. : 3,993,588
DATED : November 23, 1976
INVENTOR(S) : Prem Sagar Thukral It is certified that error appears in the above-identified patent and that said Letters Patent are hereby corrected as shown below:

Column 4, line 51, after "vacuum oven" insert the words --at 150°C and the mixture heated in an activation furnace to 400°C.--

Signed and Sealed this

Tenth Day of June 1980

[SEAL]

Attest:

SIDNEY A. DIAMOND

Attesting Officer

Commissioner of Patents and Trademarks